US012607515B2

(12) United States Patent
Lu et al.

(10) Patent No.: US 12,607,515 B2
(45) Date of Patent: Apr. 21, 2026

(54) SYSTEMS AND METHODS FOR TEMPERATURE DETERMINATION

(71) Applicant: ZHEJIANG PIXFRA TECHNOLOGY CO., LTD., Zhejiang (CN)

(72) Inventors: Huachao Lu, Hangzhou (CN); Su Liu, Hangzhou (CN); Diquan Xu, Hangzhou (CN); Tao Pu, Hangzhou (CN); Ziwei Wei, Hangzhou (CN)

(73) Assignee: ZHEJIANG PIXFRA TECHNOLOGY CO., LTD., Hangzhou (CN)

( * ) Notice: Subject to any disclaimer, the term of this patent is extended or adjusted under 35 U.S.C. 154(b) by 357 days.

(21) Appl. No.: 18/346,846

(22) Filed: Jul. 4, 2023

(65) Prior Publication Data

US 2023/0341267 A1 Oct. 26, 2023

Related U.S. Application Data

(63) Continuation of application No. PCT/CN2021/115875, filed on Sep. 1, 2021.

(30) Foreign Application Priority Data

Jan. 13, 2021 (CN) .......................... 202110042528.5

(51) Int. Cl.
*G01J 5/00* (2022.01)
*G06T 7/50* (2017.01)
*G06V 40/16* (2022.01)

(52) U.S. Cl.
CPC .............. *G01J 5/0025* (2013.01); *G06T 7/50* (2017.01); *G06V 40/166* (2022.01);
(Continued)

(58) Field of Classification Search
CPC .. G01J 5/0025; G01J 2005/0077; G01J 5/025; G01J 5/026; G01J 5/0265;
(Continued)

(56) References Cited

U.S. PATENT DOCUMENTS 10,346,685 B2 * 7/2019 Ding ....................... G06T 7/254
11,204,281 B1 * 12/2021 Ouellette ............. G06V 40/166
(Continued)

FOREIGN PATENT DOCUMENTS

CN 111207836 A 5/2020
CN 111337142 A 6/2020
(Continued)

OTHER PUBLICATIONS

The Extended European Search Report in European Application No. 21918933.9 mailed on Feb. 19, 2024, 10 pages.
(Continued)

*Primary Examiner* — Matthew C Bella
*Assistant Examiner* — Andrew B. Jones
(74) *Attorney, Agent, or Firm* — METIS IP LLC

(57) ABSTRACT

The present disclosure may provide a temperature determination system. The temperature determination system may obtain a visible image including at least one subject and a thermal image from an image capture device. For each of the at least one subject, the temperature determination system may determine first location information associated with a face of the subject in the visible image and determine a distance between the subject and the image capture device based on the visible image. The temperature determination system may also determine second location information associated with the face in the thermal image based on the first location information associated with the face. The temperature determination system may determine a temperature of the subject based on the second location infor- (Continued)

mation associated with the face and the distance between the subject and the image capture device.

19 Claims, 11 Drawing Sheets

(52) U.S. Cl.
 CPC ................. *G01J 2005/0077* (2013.01); *G06T 2207/10048* (2013.01); *G06T 2207/30201* (2013.01); *G06T 2207/30204* (2013.01)

(58) Field of Classification Search
 CPC ............. G06T 7/50; G06T 2207/10048; G06T 2207/30201; G06T 2207/30204; G06T 7/0012; G06T 7/90; G06V 40/166; G06V 10/143; G06V 40/15; G06V 40/161; G06V 40/178; G06V 40/16; A61B 2576/02; A61B 5/015; A61B 2560/0252; A61B 5/01
 See application file for complete search history.

(56) References Cited

U.S. PATENT DOCUMENTS

| | | | |
|---|---|---|---|
| 2009/0136093 | A1 | 5/2009 | Hartlove |
| 2017/0163953 | A1 | 6/2017 | Wang et al. |
| 2018/0140186 | A1 * | 5/2018 | Limon ................... A61B 3/111 |
| 2023/0135198 | A1 * | 5/2023 | Osborne ............... G06Q 20/18 |
| | | | 705/16 |

FOREIGN PATENT DOCUMENTS

| | | | | |
|---|---|---|---|---|
| CN | 111339854 | A | 6/2020 | |
| CN | 111458042 | A | 7/2020 | |
| CN | 111693147 | A | 9/2020 | |
| CN | 112102207 | A * | 12/2020 | .......... G06V 40/168 |
| CN | 112200002 | A | 1/2021 | |
| KR | 102161477 | B1 * | 10/2020 | ............. G01J 5/804 |
| WO | 2022151742 | A1 | 7/2022 | |

OTHER PUBLICATIONS

International Search Report in PCT/CN2021/115875 mailed on Nov. 26, 2021, 4 pages.
Written Opinion in PCT/CN2021/115875 mailed on Nov. 26, 2021, 5 pages.

\* cited by examiner

<u>200</u>

500

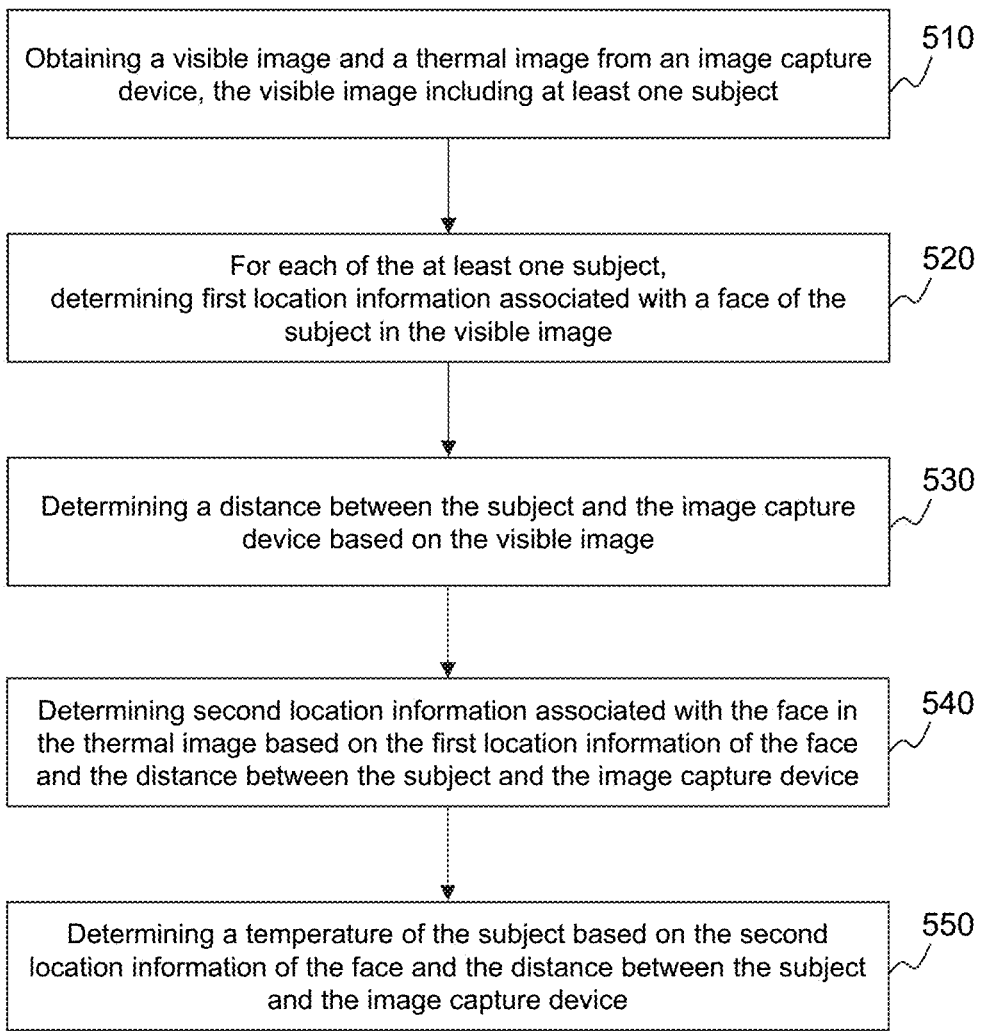

Obtaining a visible image and a thermal image from an image capture device, the visible image including at least one subject — 510

For each of the at least one subject, determining first location information associated with a face of the subject in the visible image — 520

Determining a distance between the subject and the image capture device based on the visible image — 530

Determining second location information associated with the face in the thermal image based on the first location information of the face and the distance between the subject and the image capture device — 540

Determining a temperature of the subject based on the second location information of the face and the distance between the subject and the image capture device — 550

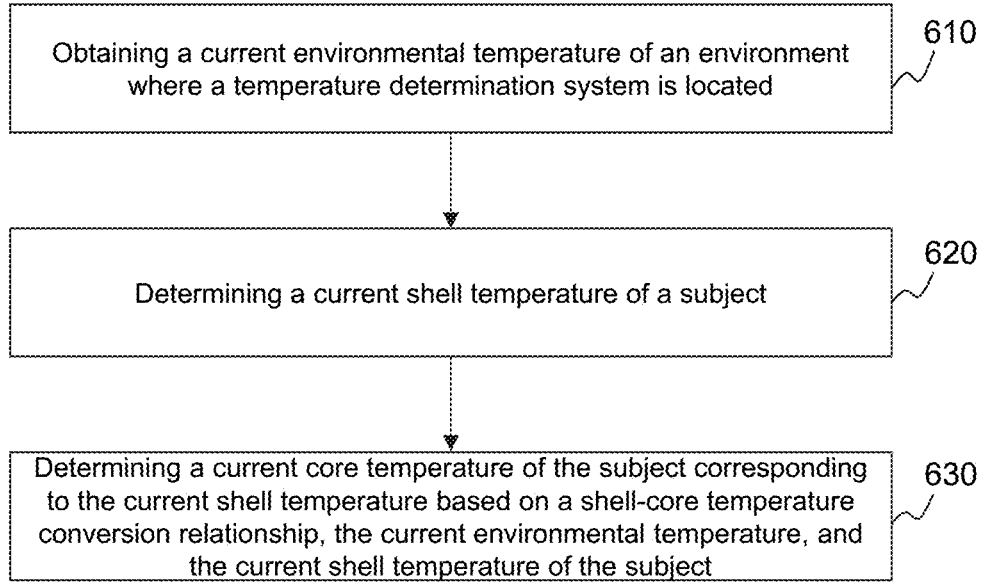

Obtaining a current environmental temperature of an environment where a temperature determination system is located          610

Determining a current shell temperature of a subject          620

Determining a current core temperature of the subject corresponding to the current shell temperature based on a shell-core temperature conversion relationship, the current environmental temperature, and the current shell temperature of the subject          630

FIG. 6

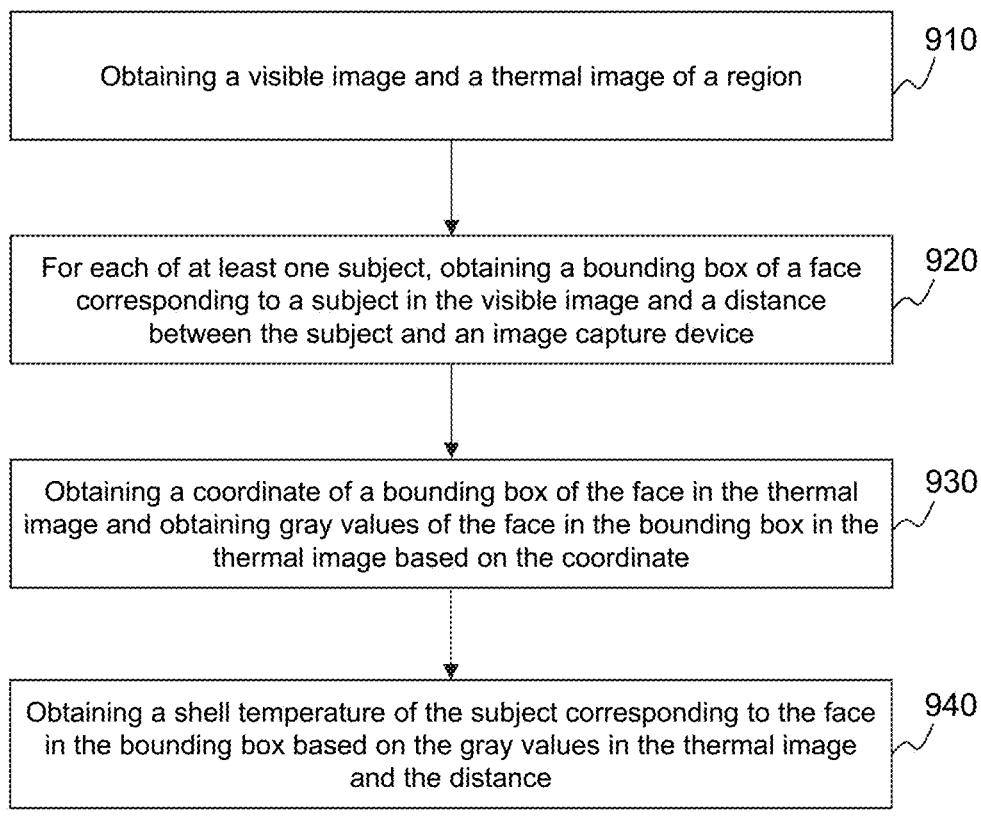

900

Obtaining a visible image and a thermal image of a region — 910

For each of at least one subject, obtaining a bounding box of a face corresponding to a subject in the visible image and a distance between the subject and an image capture device — 920

Obtaining a coordinate of a bounding box of the face in the thermal image and obtaining gray values of the face in the bounding box in the thermal image based on the coordinate — 930

Obtaining a shell temperature of the subject corresponding to the face in the bounding box based on the gray values in the thermal image and the distance — 940

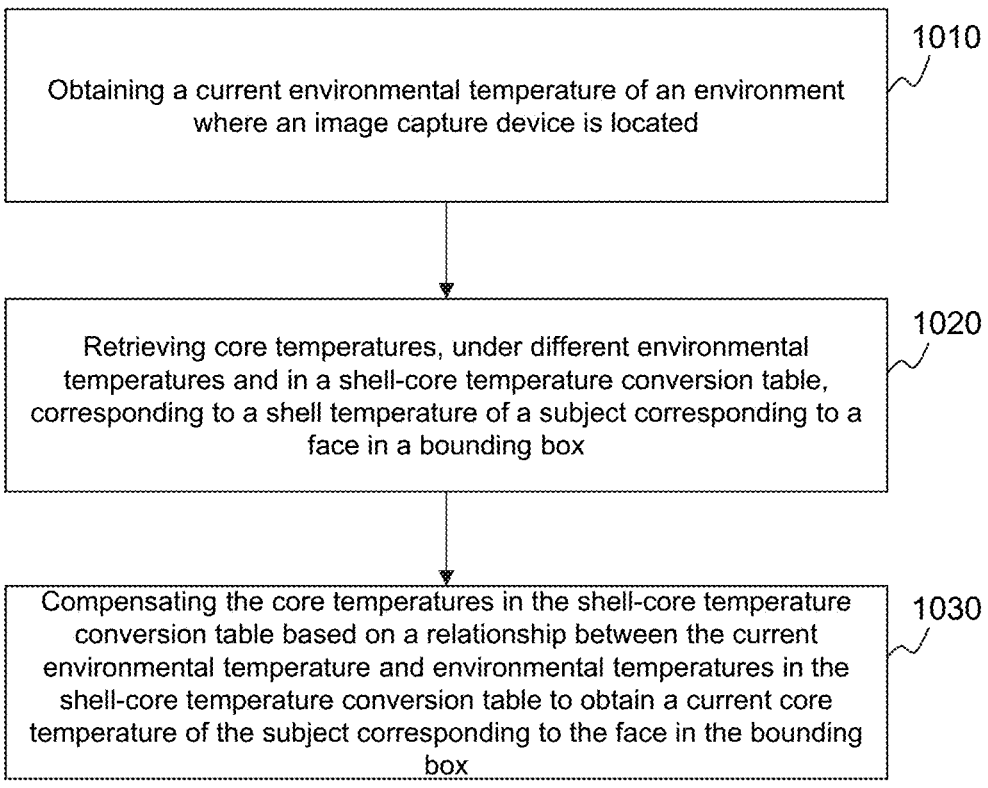

Obtaining a current environmental temperature of an environment where an image capture device is located                                              1010

Retrieving core temperatures, under different environmental temperatures and in a shell-core temperature conversion table, corresponding to a shell temperature of a subject corresponding to a face in a bounding box                                              1020

Compensating the core temperatures in the shell-core temperature conversion table based on a relationship between the current environmental temperature and environmental temperatures in the shell-core temperature conversion table to obtain a current core temperature of the subject corresponding to the face in the bounding box                                              1030

SYSTEMS AND METHODS FOR TEMPERATURE DETERMINATION

CROSS-REFERENCE TO RELATED APPLICATIONS

This application is a continuation of International Application No. PCT/CN2021/115875, filed on Sep. 1, 2021, which claims priority to Chinese Patent Application No. 202110042528.5 filed on Jan. 13, 2021, the entire contents of each of which are hereby incorporated by reference.

TECHNICAL FIELD

The present disclosure generally relates to thermal imaging, and in particular, to systems and methods for determining a temperature of a subject.

BACKGROUND

A temperature of a subject (e.g., a person) may be determined based on gray values associated with the subject in a thermal image acquired by a thermal capture device (e.g., a thermal camera). However, thermal radiation of the subject may be attenuated as a distance between the thermal capture device and the subject increases, accordingly, the larger the distance between the thermal capture device and the subject is, the lower the temperature of the subject determined based on the thermal image may be, which can't accurately indicate an actual temperature of the subject. Therefore, it is desirable to provide systems and methods for determining a temperature of a subject accurately with distance taken into consideration.

SUMMARY

According to one aspect of the present disclosure, a system may be provided. The system may include at least one storage device including a set of instructions; and at least one processor in communication with the at least one storage device, wherein when executing the set of instructions, the at least one processor may be configured to cause the system to: obtain a visible image and a thermal image from an image capture device, the visible image including at least one subject; for each of the at least one subject, determine first location information associated with a face of the subject in the visible image; determine a distance between the subject and the image capture device based on the visible image; determine second location information associated with the face in the thermal image based on the first location information associated with the face; and determine a temperature of the subject based on the second location information associated with the face and the distance between the subject and the image capture device.

In some embodiments, to determine a distance between the subject and the image capture device based on the visible image, the at least one processor may be configured to cause the system to: determine a visible size associated with at least one reference object associated with the subject in the visible image; and determine the distance between the subject and the image capture device based on the visible size associated with the at least one reference object in the visible image and a physical size associated with the at least one reference object.

In some embodiments, the at least one reference object may include pupil points of the subject, a marker stick to the subject, or an environmental marker.

In some embodiments, to determine second location information associated with the face in the thermal image based on the first location information associated with the face, the at least one processor may be configured to cause the system to: determine the second location information associated with the face in the thermal image based on the first location information associated with the face and a location relationship between a visible capture unit used to capture the visible image and a thermal capture unit used to capture the thermal image included in the image capture device.

In some embodiments, to determine a temperature of the subject based on the second location information associated with the face and the distance between the subject and the image capture device, the at least one processor may be configured to cause the system to: determine gray values associated with the face in the thermal image based on the second location information; and determine the temperature of the subject based on the gray values associated with the face in the thermal image and the distance between the subject and the image capture device.

In some embodiments, the at least one processor may be configured to cause the system further to: determine whether the temperature of the subject is within a reference temperature range; in response to determining that the temperature of the subject is within the reference temperature range, cause a display device to display information associated with the subject; and in response to determining that the temperature of the subject is not within the reference temperature range, not cause the display device to display information associated with the subject.

In some embodiments, the displayed information associated with the subject may include at least one of a bounding box of the face, the temperature of the subject, the distance between the subject and the image capture device, or a location of the subject.

In some embodiments, to cause the display device to display information associated with the subject, the at least one processor may be configured to cause the system further to: determine whether the temperature of the subject is within a normal temperature range; in response to determining that the temperature of the subject is within the normal temperature range, cause the display device to display the information associated with the subject in a first mode; in response to determining that the temperature of the subject is not within the normal temperature range, cause the display device to display the information associated with the subject in a second mode.

In some embodiments, the at least one processor may be configured to cause the system further to: in response to determining that the temperature of the subject is not within the reference temperature range or the normal temperature range, perform at least one additional temperature determination operation.

In some embodiments, the at least one processor may be configured to cause the system further to: for each of the at least one subject, determine a reference parameter associated with the subject, the reference parameter including at least one of the distance between the subject and the image capture device, a moving speed of the subject, or a moving direction of the subject; and determine a priority order of the at least one subject based on at least one reference parameter corresponding to the at least one subject respectively.

According to another aspect of the present disclosure, a method may be provided. The method may be implemented on a computing device having at least one processor, at least one storage medium, and a communication platform connected to a network. The method may include: obtaining a visible image and a thermal image from an image capture device, the visible image including at least one subject; for each of the at least one subject, determining first location information associated with a face of the subject in the visible image; determining a distance between the subject and the image capture device based on the visible image; determining second location information associated with the face in the thermal image based on the first location information associated with the face; and determining a temperature of the subject based on the second location information associated with the face and the distance between the subject and the image capture device.

In some embodiments, the determining a distance between the subject and the image capture device based on the visible image may include: determining a visible size associated with at least one reference object associated with the subject in the visible image; and determining the distance between the subject and the image capture device based on the visible size associated with the at least one reference object in the visible image and a physical size associated with the at least one reference object.

In some embodiments, the at least one reference object may include pupil points of the subject, a marker stick to the subject, or an environmental marker.

In some embodiments, the determining second location information associated with the face in the thermal image based on the first location information associated with the face may include: determining the second location information associated with the face in the thermal image based on the first location information associated with the face and a location relationship between a visible capture unit used to capture the visible image and a thermal capture unit used to capture the thermal image included in the image capture device.

In some embodiments, the determining a temperature of the subject based on the second location information associated with the face and the distance between the subject and the image capture device may include: determining gray values associated with the face in the thermal image based on the second location information; and determining the temperature of the subject based on the gray values associated with the face in the thermal image and the distance between the subject and the image capture device.

In some embodiments, the method may further include: determining whether the temperature of the subject is within a reference temperature range; in response to determining that the temperature of the subject is within the reference temperature range, causing a display device to display information associated with the subject; and in response to determining that the temperature of the subject is not within the reference temperature range, not causing the display device to display information associated with the subject.

In some embodiments, the displayed information associated with the subject may include at least one of a bounding box of the face, the temperature of the subject, the distance between the subject and the image capture device, or a location of the subject.

In some embodiments, the causing the display device to display information associated with the subject may include: determining whether the temperature of the subject is within a normal temperature range; in response to determining that the temperature of the subject is within the normal temperature range, causing the display device to display the information associated with the subject in a first mode; in response to determining that the temperature of the subject is not within the normal temperature range, causing the display device to display the information associated with the subject in a second mode.

In some embodiments, the method may further include: in response to determining that the temperature of the subject is not within the reference temperature range or the normal temperature range, performing at least one additional temperature determination operation.

In some embodiments, the method may further include: for each of the at least one subject, determining a reference parameter associated with the subject, the reference parameter including at least one of the distance between the subject and the image capture device, a moving speed of the subject, or a moving direction of the subject; and determining a priority order of the at least one subject based on at least one reference parameter corresponding to the at least one subject respectively.

According to another aspect of the present disclosure, a non-transitory computer readable medium may be provided. The non-transitory computer readable medium may include executable instructions that, when executed by at least one processor, may direct the at least one processor to perform a method. The method may include: obtaining a visible image and a thermal image from an image capture device, the visible image including at least one subject; for each of the at least one subject, determining first location information associated with a face of the subject in the visible image; determining a distance between the subject and the image capture device based on the visible image; determining second location information associated with the face in the thermal image based on the first location information associated with the face; and determining a temperature of the subject based on the second location information associated with the face and the distance between the subject and the image capture device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 5 is a flowchart illustrating an exemplary process for determining a temperature of a subject according to some embodiments of the present disclosure;

FIG. 6 is a flowchart illustrating an exemplary process for determining a temperature of a subject according to some embodiments of the present disclosure;

FIG. 9 is a flowchart illustrating an exemplary process for determining a temperature of a subject according to some embodiments of the present disclosure;

FIG. 10 is a flowchart illustrating an exemplary process for determining a temperature of a subject according to some embodiments of the present disclosure.

DETAILED DESCRIPTION

Figure 1:
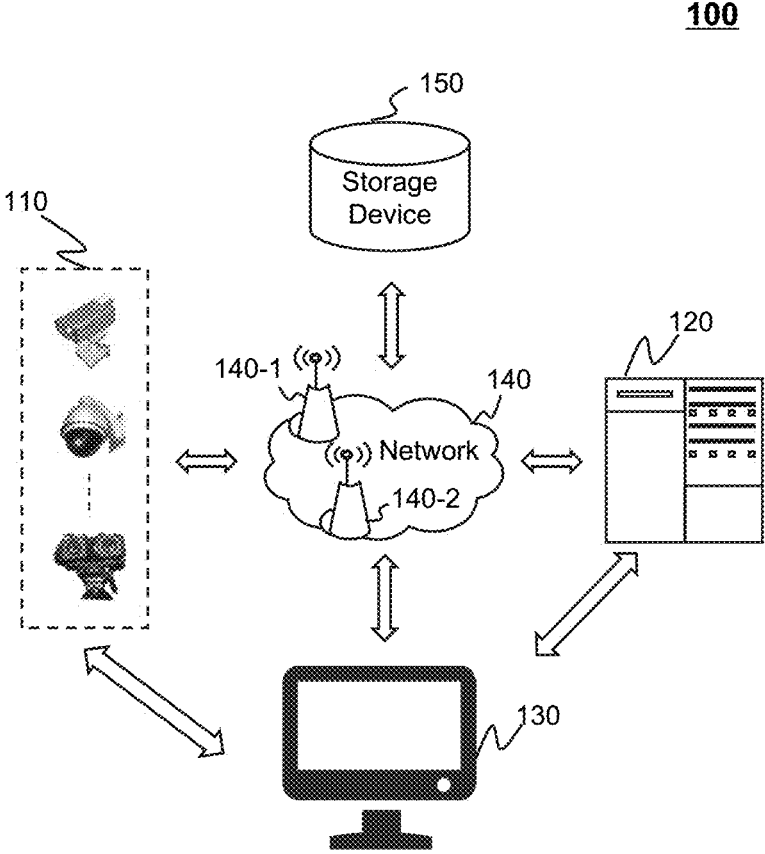
FIG. 1 is a schematic diagram illustrating an exemplary temperature determination system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for determining a temperature (e.g., a shell temperature, a core temperature) of a subject. The systems may obtain a visible image and a thermal image of at least one subject from an image capture device. Take a specific subject as an example, the systems may determine first location information associated with a face of the subject in the visible image and determine a distance between the subject and the image capture device based on the visible image. The systems may also determine second location information associated with the face in the thermal image based on the first location information. Further, the systems may determine a temperature of the subject based on gray values associated with the face in the thermal image based on the second location information associated with the face and the distance.

Since thermal radiation of the subject may be attenuated as the distance between the image capture device and the subject increases, the larger the distance between the image capture device and the subject is, the lower the temperature of the subject determined based on the gray values may be.

According to some embodiments of the present disclosure, the systems may determine the temperature of the subject with the distance between the subject and the image capture device taken into consideration, thereby improving the accuracy of the determined temperature of the subject.

Since the distance between the subject and the image capture device is taken into consideration, temperature information of a plurality of subjects can be determined substantially at the same time. Accordingly, the plurality of subjects don't have to stand in a fixed position to measure temperature information, thereby improving temperature determination efficiency.

FIG. 1 is a schematic diagram illustrating an exemplary temperature determination system according to some embodiments of the present disclosure. In some embodiments, the temperature determination system 100 may include an image capture device 110, a processing device 120, a display device 130, a network 140, and a storage device 150. In some embodiments, the temperature determination system 100 may be applied to real-time temperature determination of at least one subject (e.g., a person) in a region, for example, an airport, a railway station, a bus station, a stadium, etc. The at least one subject may be in a moving state or in a non-moving state.

The image capture device 110 may be an electronic device having an imaging function. In some embodiments, the image capture device 110 may include a camera (e.g., a binocular camera), a video camera, a mobile phone, a tablet, an e-book reader, or the like, or any combination thereof. In some embodiments, the image capture device 110 may include at least one image capture unit used to acquire image(s). In some embodiments, the image capture device 110 may include a visible capture unit (e.g., a visible camera, a visible lens) used to acquire a visible image and a thermal capture unit (e.g., a thermal camera, a thermal lens) used to acquire a thermal image. For example, the image capture device 110 may include a binocular camera including the visible lens and the thermal lens. As another example, the image capture device 110 may include the visible camera and the thermal camera independent from the visible camera.

In some embodiments, a position and/or an orientation (e.g., an angle, a direction) of the image capture device 110 may be adjustable. In some embodiments, the image capture device 110 may include an auxiliary movement assembly configured to adjust the position and/or the orientation of the image capture device 110. In some embodiments, the image capture device 110 may acquire image(s) continuously, within a specific time interval, or based on a control command. The acquired image(s) may be stored in the storage device 150, or transmitted to other components via the network 140 for storage or further processing. In some embodiments, the image capture device 110 may be integrated into, mounted on, or connected to the display device 130.

The processing device 120 may be configured to determine a temperature of a subject based on image(s) (e.g., a visible image and a thermal image) acquired by the image capture device 110. The temperature of the subject may include a shell temperature of the subject, a core temperature of the subject, etc. In some embodiments, the processing device 120 may include a single server or a server group. The server group may be centralized or distributed (e.g., the processing device 120 may be a distributed system). In some embodiments, the processing device 120 may be local or remote. For example, the processing device 120 may access information and/or data stored in the image capture device

110, the display device 130, and/or the storage device 150 via the network 140. As another example, the processing device 120 may be directly connected to the image capture device 110, the display device 130, and/or the storage device 150 to access stored information and/or data. In some embodiments, the processing device 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 including one or more components illustrated in FIG. 2 of the present disclosure.

In some embodiments, the processing device 120 may process information and/or data associated with temperature determination to perform one or more functions described in the present disclosure. In some embodiments, the processing device 120 may include one or more processing engines (e.g., single-core processing engine(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the processing device 120 may be connected to the network 140 to communicate with one or more components (e.g., the image capture device 110, the display device 130, the storage device 150) of the temperature determination system 100. In some embodiments, the processing device 120 may be directly connected to or communicate with one or more components (e.g., the image capture device 110, the display device 130, the storage device 150) of the temperature determination system 100.

The display device 130 may be configured to display relevant information associated with temperature determination. In some embodiments, the display device 130 may display information associated with the subject. In some embodiments, the display device 130 may display the information associated with the subject in various modes in response to that the temperature of the subject is within different temperature ranges. In some embodiments, the display device 130 may include a liquid crystal display (LCD), a flat panel display, a curved panel display, a television device, a cathode ray tube (CRT), or the like, or any combination thereof.

The network 140 may facilitate exchange of information and/or data. In some embodiments, one or more components (e.g., the image capture device 110, the processing device 120, the display device 130, the storage device 150) of the temperature determination system 100 may transmit information and/or data to other component(s) of the temperature determination system 100 via the network 140. For example, the processing device 120 may obtain the visible image and the thermal image from the storage device 150 via the network 140. In some embodiments, the network 140 may be any type of wired or wireless network, or combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points (e.g., a point 140-1, a point 140-2), through which one or more components of the temperature determination system 100 may be connected to the network 140 to exchange data and/or information.

The storage device 150 may store data and/or instructions. In some embodiments, the storage device 150 may store data obtained from the image capture device 110, the processing device 120, the display device 130, or an external storage device. For example, the storage device 150 may store the visible image and the thermal image acquired by the image capture device 110. In some embodiments, the storage device 150 may store data and/or instructions that the processing device 120 may execute or use to perform exemplary methods described in the present disclosure. For example, the storage device 150 may store instructions that the processing device 120 may execute or use to determine a temperature of a subject based on the visible image and the thermal image.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components (e.g., the image capture device 110, the processing device 120, the display device 130) of the temperature determination system 100. One or more components of the temperature determination system 100 may access the data or instructions stored in the storage device 150 via the network 140. In some embodiments, the storage device 150 may be directly connected to or communicate with one or more components (e.g., the image capture device 110, the processing device 120, the display device 130) of the temperature determination system 100. In some embodiments, the storage device 150 may be part of the processing device 120. For example, the storage device 150 may be integrated into the processing device 120.

It should be noted that the temperature determination system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the temperature determination system 100 may also include a user device (not shown) configured to receive information and/or data from the image capture device 110, the processing device 120, the display device 130, and/or the storage device 150. The user device may provide a user interface via which a user may view information (a temperature) and/or input data (e.g., user information) and/or instructions to the temperature determination system 100.

In some embodiments, the temperature determination system 100 may also include an input/output (I/O) component. The I/O component may be configured to input or output signals, data, or information. In some embodiments, the I/O component may include an input device and an output device. Exemplary input devices may include a keyboard, a mouse, a touch screen, a microphone, or the like, or any combination thereof. Exemplary output devices may include a display device, a speaker, a printer, a projector, or the like, or any combination thereof.

In some embodiments, the temperature determination system 100 may also include a communication port. The communication port may be connected to the network 140 for data communication. The connection may include a wired connection, a wireless connection, or a combination thereof. The wired connection may include an electric cable, an optical cable, or a telephone line, or the like, or any combination thereof. The wireless connection may include Bluetooth, Wi-Fi, WiMAX, WLAN, ZigBee, a mobile network (eg, 3G, 4G, or 5G, etc.), or the like, or any combination thereof. In some embodiments, the communication port may include a normalized port, such as RS232, RS485, etc. In some embodiments, the communication port may include a specially designed port.

Figure 2:
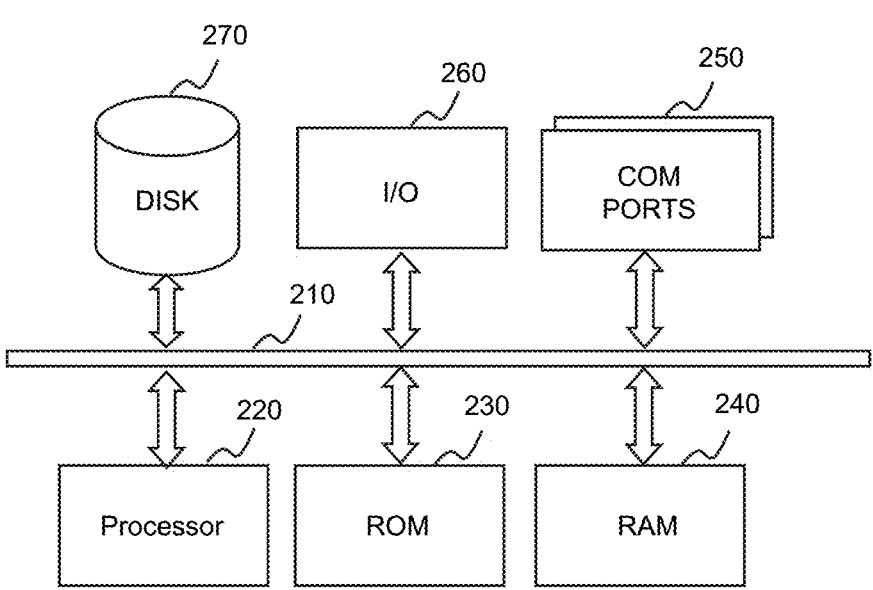
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the temperature determination system 100 as described herein. For example, the processing device 120 may be implemented on the computing device 200, via its hardware, software program, firmware, or a combination thereof. Although only one such computer is shown, for convenience, the computer functions relating to temperature determination as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., a magnetic storage device, a flash memory, or other non-volatile solid state memories) (not shown), a disk 270, a read-only memory (ROM) 230, a random-access memory (RAM) 240, or the like, or any combination thereof. In some embodiments, the one or more storages may further include a remote storage corresponding to the processor 220. The remote storage may connect to the computing device 200 via the network 140. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
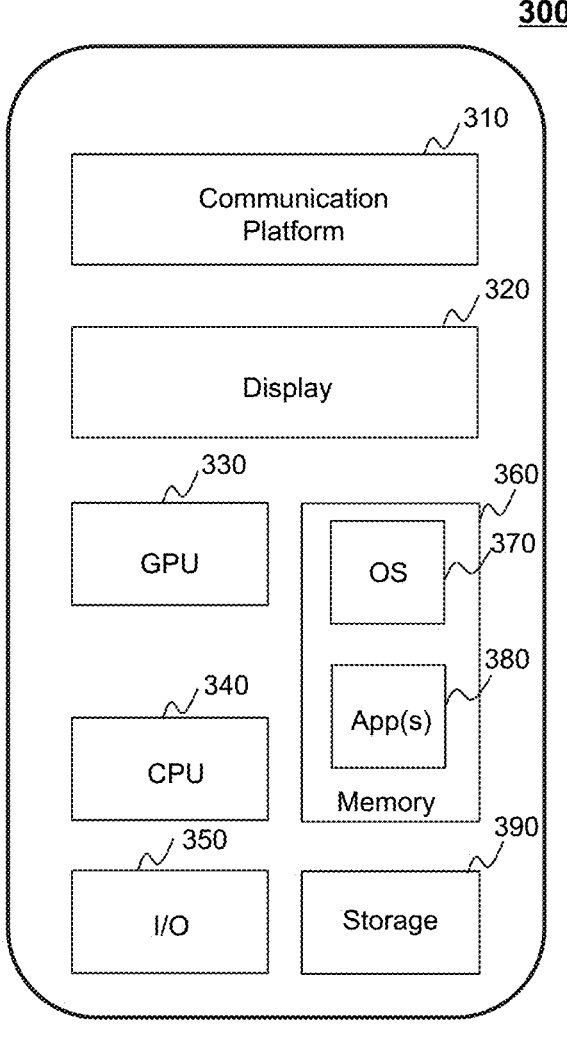
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 120 or the user device may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and a storage 390. In some embodiments, any other suitable components, including but not limited to a system bus or a controller (not shown), may also be in the mobile device 300.

In some embodiments, the mobile operating system 370 (e.g., iOS™, Android™ Windows Phone™) and one or more applications 380 may be loaded into the memory 360 from the storage 390 in order to be executed by the CPU 340. The applications 380 may include a browser or any other suitable mobile apps for receiving and rendering information relating to temperature determination or other information from the temperature determination system 100. User interactions with the information stream may be achieved via the I/O 350 and provided to the processing device 120 and/or other components of the temperature determination system 100 via the network 140.

Figure 4:
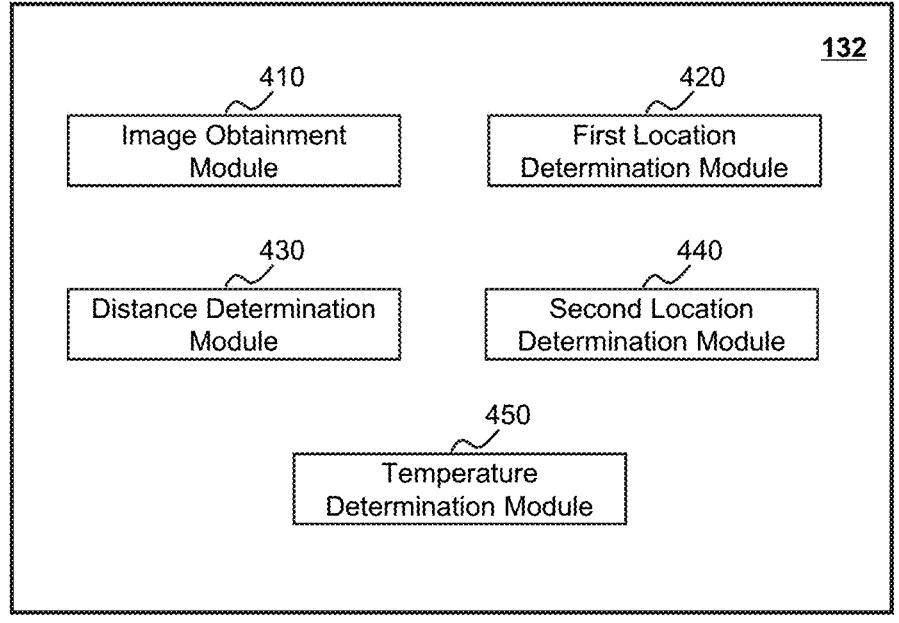
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may include an image obtainment module 410, a first location determination module 420, a distance determination module 430, a second location determination module 440, and a temperature determination module 450.

In some embodiments, the image obtainment module 410 may be configured to obtain a visible image and a thermal image from an image capture device. The visible image may include at least one subject in a region (e.g., an airport, a railway station, a bus station, a stadium). The region may be an overlapping region of a first capture region corresponding to the visible capture unit and a second capture region corresponding to the thermal capture unit.

In some embodiments, for each of the at least one subject, the first location determination module 420 may be configured to determine first location information associated with a face of the subject in the visible image. In some embodiments, the first location determination module 420 may identify the face of the subject and/or determine the first location information by performing a recognition operation on the visible image. In some embodiments, the first location information associated with the face of the subject may include a bounding box of the face, a size of the bounding box of the face, a location of the bounding box of the face, etc., in the visible image.

In some embodiments, the distance determination module 430 may be configured to determine a distance between the subject and the image capture device based on the visible image. In some embodiments, the distance between the subject and the image capture device may include a distance between a reference point (e.g., a center of the subject, a center of the face of the subject, a pupil point of the face) of the subject and a reference point (e.g., a center of the image capture device, a center of the visible capture unit, a center of the thermal capture unit) of the image capture device.

In some embodiments, the distance determination module 430 may determine a visible size associated with at least one reference object associated with the subject in the visible image. The distance determination module 430 may also determine the distance between the subject and the image capture device based on the visible size associated with the at least one reference object in the visible image and a physical size (also referred to as an "actual size," which may be predetermined or known) associated with the at least one reference object. In some embodiments, the at least one reference object may include pupil points of the subject, at least one marker (e.g., an opaque tape, a strip, a rod) stick to the subject, at least one environmental marker (e.g., an opaque tape, a strip, a rod), or the like, or any combination thereof.

In some embodiments, take the "pupil points of the subject" as an example, the distance determination module 430 may determine a visible size associated with the pupil points of the subject in the visible image, for example, a visible distance (e.g., d illustrated in FIG. 7) (also referred to as "a visible pupillary distance") between the pupil points of the subject in the visible image. The distance determination module 430 may also determine the distance between the subject and the image capture device based on the visible pupillary distance and a physical distance (also referred to as a "physical pupillary distance" or an "actual pupillary distance") between the pupil points of the subject.

In some embodiments, the physical pupillary distance of the subject may relate to an age of the subject. In some embodiments, the distance determination module 430 may determine the distance between the subject and the image capture device based on the visible pupillary distance, the physical pupillary distance of the subject, and the age of the subject.

In some embodiments, the second location determination module 440 may be configured to determine second location information associated with the face in the thermal image based on the first location information associated with the face. In some embodiments, the second location information associated with the face may include a bounding box of the face, a size of the bounding box of the face, a location (e.g., a location of the bounding box of the face) (e.g., a two-dimensional coordinate, a three-dimensional coordinate) of the face, etc., in the thermal image.

In some embodiments, the second location determination module 440 may determine the second location information associated with the face in the thermal image based on the first location information and a location relationship between the visible capture unit and the thermal capture unit. In some embodiments, the second location determination module 440 may determine a coordinate conversion relationship between a first coordinate of the visible capture unit and a second coordinate of the thermal capture unit based on the location relationship between the visible capture unit and the thermal capture unit. The second location determination module 440 may also determine the second location information based on the first location information and the coordinate conversion relationship.

In some embodiments, the temperature determination module 450 may be configured to determine a temperature of the subject based on the second location information associated with the face and the distance between the subject and the image capture device. In some embodiments, the temperature determination module 450 may determine gray values (e.g., gray values of a face region, gray values of a forehead region, gray values of a central forehead region) associated with the face in the thermal image based on the second location information associated with the face. The temperature determination module 450 may also determine the temperature of the subject based on the gray values associated with the face in the thermal image and the distance between the subject and the image capture device.

In some embodiments, the temperature determination module 450 may also determine a core temperature of the subject based on the target temperature (which may be a shell temperature) of the subject and a core-shell temperature conversion relationship.

In some embodiments, the temperature determination module 450 may determine whether the temperature of the subject is within a reference temperature range. In some embodiments, the reference temperature range may include a default temperature range that the temperature determination system 100 can measure, a temperature range predetermined by an operator, etc.

In some embodiments, in response to determining that the temperature of the subject is within the reference temperature range, the temperature determination module 450 may cause a display device (e.g., the display device 130) to display information associated with the subject. In some embodiments, the temperature determination module 450 may add the information associated with the subject in the visible image or the thermal image and cause the display device to display the visible image or the thermal image with the information.

In some embodiments, in response to determining that the temperature of the subject is not within the reference temperature range, the temperature determination module 450 may not cause the display device to display the information associated with the subject.

In some embodiments, in response to determining that the temperature of the subject is within the reference temperature range, the temperature determination module 450 may also determine whether the temperature of the subject is within a normal temperature range (e.g., 35° C.-37° C.). In response to determining that the temperature of the subject is within the normal temperature range, the temperature determination module 450 may cause the display device to display the information associated with the subject in a first mode. In response to determining that the temperature of the subject is not within the normal temperature range, the temperature determination module 450 may cause the display device to display the information associated with the subject in a second mode.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first location determination module 420 and the second location determination module 440 may be combined as a single module which may determine the first location information associated with the face of the subject in the visible image and determine the second location information associated with the face in the thermal image. As another example, the processing device 120 may include a storage module (not shown) which may be used to store data generated by the above-mentioned modules.

FIG. 5 is a flowchart illustrating an exemplary process for determining a temperature of a subject according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process illustrated in FIG. 5 and described below is not intended to be limiting.

In 510, the processing device 120 (e.g., the image obtainment module 410) (e.g., the interface circuits of the processor 220) may obtain a visible image and a thermal image from an image capture device (e.g., the image capture device 110). In some embodiments, as described in connection with FIG. 1, the image capture device may include a visible capture unit (e.g., a visible camera, a visible lens) used to capture the visible image and a thermal capture unit (e.g., a thermal camera, a thermal lens) used to capture the thermal image.

In some embodiments, the visible image and the thermal image may be captured simultaneously or substantially simultaneously. In some embodiments, the visible image and/or the thermal image may include at least one subject in a region (e.g., an airport, a railway station, a bus station, a stadium). The region may be an overlapping region of a first capture region corresponding to the visible capture unit and a second capture region corresponding to the thermal capture unit. For example, the overlapping region may be 50%-100% of the first capture region or the second capture region.

In 520, for each of the at least one subject, the processing device 120 (e.g., the first location determination module 420) (e.g., the processing circuits of the processor 220) may determine first location information associated with a face of the subject in the visible image.

In some embodiments, the processing device 120 may identify the face of the subject and/or determine the first location information by performing a recognition operation on the visible image. The recognition result of the visible image may include a bounding box of the face, a size (e.g., an area, a length, a width) of the bounding box of the face, a location (e.g., a two-dimensional coordinate, a three-dimensional coordinate) of the bounding box of the face, an age of the subject, a feature (e.g., a feature point) of the face, a confidence value of the face, a bounding box of an object (e.g., a marker associated with the subject, an environmental marker) in the visible image, a size (e.g., an area, a length, a width) of the bounding box of the object, a location of the bounding box of the object, or the like, or any combination thereof.

In some embodiments, the processing device 120 may perform the recognition operation using a recognition model. In some embodiments, the recognition model may be determined using a machine learning technique. For example, the recognition model may include a convolutional neural network (CNN) model, a recurrent neural network (RNN) model, a region with CNN (RCNN) model, a fast-RCNN model, a back propagation (BP) neural network model, a K-nearest neighbor (KNN) model, a support vector machine (SVM) model, or the like, or any combination thereof.

In some embodiments, the first location information associated with the face of the subject may include the bounding box of the face, the size of the bounding box of the face, the location of the bounding box of the face, etc., in the visible image. For example, the first location information associated with the face may be expressed as [x, y, w, h], wherein x and y refer to a two-dimensional coordinate (e.g., a coordinate of a left upper corner of the bounding box of the face) associated with the face, w refers to a width of the bounding box of the face, and h refers to a length of the bounding box of the face. As another example, the first location information associated with the face may be expressed as [x, y, w, h, s], wherein s refers to the confidence value of the face of the subject.

In 530, the processing device 120 (e.g., the distance determination module 430) (e.g., the processing circuits of the processor 220) may determine a distance between the subject and the image capture device based on the visible image.

In some embodiments, the distance between the subject and the image capture device may include a distance between a reference point (e.g., a center of the subject, a center of the face of the subject, a pupil point of the face) of the subject and a reference point (e.g., a center of the image capture device, a center of the visible capture unit, a center of the thermal capture unit) of the image capture device.

In some embodiments, as described in connection with operation 520, the processing device 120 may determine the distance between the subject and the image capture device based on the recognition result of the visible image. In some embodiments, the processing device 120 may determine a visible size associated with at least one reference object associated with the subject in the visible image. Further, the processing device 120 may determine the distance between the subject and the image capture device based on the visible size associated with the at least one reference object in the visible image and a physical size (also referred to as an "actual size," which may be predetermined or known) associated with the at least one reference object. In some embodiments, the at least one reference object may include pupil points of the subject, at least one marker (e.g., an opaque tape, a strip, a rod) stick to the subject, at least one environmental marker (e.g., an opaque tape, a strip, a rod), or the like, or any combination thereof.

In some embodiments, take the "pupil points of the subject" as an example, the processing device 120 may determine a visible size associated with the pupil points of the subject in the visible image, for example, a visible distance (e.g., d illustrated in FIG. 7) (also referred to as "a visible pupillary distance") between the pupil points of the subject in the visible image. Further, the processing device 120 may determine the distance between the subject and the image capture device based on the visible pupillary distance and a physical distance (also referred to as a "physical pupillary distance" or an "actual pupillary distance") between the pupil points of the subject. In some embodiments, the physical pupillary distance of the subject may relate to an age of the subject. For example, for adults, the physical pupillary distance is a first substantially constant value (e.g., 54 millimeters-74 millimeters); for children, the physical pupillary distance is a second substantially constant value (e.g., 43 millimeters-58 millimeters).

In some embodiments, the processing device 120 may determine the distance between the subject and the image capture device based on the visible pupillary distance, the physical pupillary distance of the subject, and the age of the subject. In some embodiments, the processing device 120 may determine the distance between the subject and the image capture device according to Formula (1) below:

$$d = K_{age} * K_{cam} * d_{eye} \tag{2}$$

wherein d refers to the distance between the subject and the image capture device, $K_{age}$ refers to a correction parameter associated with the age of the subject, $K_{cam}$ refers to a conversion parameter associated with the image capture device, and $d_{eye}$ refers to the visible pupillary distance of the subject. In some embodiments, $K_{cam}$ and $K_{age}$ may be empirical constants and determined using a fitting algorithm.

In some embodiments, the age of the subject may be determined based on the recognition model described above. For example, the age of the subject may be determined based on the recognition result of the visible image. In some embodiments, the age of the subject may be determined based on an age determination model. For example, the age of the subject may be determined by inputting the visible image into the age determination model. In some embodiments, the age determination model may be determined using a machine learning technique.

In some embodiments, the image capture device may also include a second visible capture unit used to acquire a second visible image. The visible image and the second visible image may be acquired simultaneously or substantially simultaneously. In some embodiments, the visible capture unit and the second visible capture unit may be integrated as a binocular camera. The processing device 120 may determine the distance between the subject and the image capture device by registering the visible image and the second visible image.

In some embodiments, the visible capture unit may include a time-of-flight (ToF) camera. The processing device 120 may record a time duration from an emission of an infrared light of the ToF camera to a receiving time of the infrared light reflected by the subject. The processing device 120 may determine the distance between the subject and the image capture device based on the time duration.

In 540, the processing device 120 (e.g., the second location determination module 440) (e.g., the processing circuits of the processor 220) may determine second location information associated with the face in the thermal image based on the first location information associated with the face.

In some embodiments, the second location information associated with the face may include a bounding box of the face, a size of the bounding box of the face, a location (e.g., a location of the bounding box of the face) (e.g., a two-dimensional coordinate, a three-dimensional coordinate) of the face, etc., in the thermal image.

In some embodiments, the processing device 120 may determine the second location information associated with the face in the thermal image based on the first location information and a location relationship between the visible capture unit and the thermal capture unit. In some embodiments, the processing device 120 may determine a coordinate conversion relationship between a first coordinate of the visible capture unit and a second coordinate of the thermal capture unit based on the location relationship between the visible capture unit and the thermal capture unit. Further, the processing device 120 may determine the second location information based on the first location information and the coordinate conversion relationship.

In some embodiments, the processing device 120 may align the thermal image with the visible image and determine the second location information associated with the face in the aligned thermal image based on the first location information. In some embodiments, the processing device 120 may align the thermal image with the visible image by translating or rotating the thermal image, adjusting a size of the thermal image, etc. In some embodiments, the processing device 120 may align the thermal image with the visible image using a feature determination algorithm. For example, the processing device 120 may determine one or more first feature points of the visible image and one or more second feature points of the thermal image using the feature determination algorithm. Then the processing device 120 may align the thermal image with the visible image by matching the one or more first feature points with the one or more second feature points. In some embodiments, the feature determination algorithm may include a scale-invariant feature transform (SIFT) algorithm, a speeded-up robust feature (SURF) algorithm, etc.

In some embodiments, the processing device 120 may determine the location relationship between the visible capture unit and the thermal capture unit based on reference object(s) (e.g., a reference point with a fixed position). For example, the processing device 120 may obtain reference visible image(s) and reference thermal image(s) of the reference object(s). Further, the processing device 120 may determine the location relationship between the visible capture unit and the thermal capture unit based on the reference visible image(s) and the reference thermal image(s). For example, the processing device 120 may determine the location relationship between the visible capture unit and the thermal capture unit by performing an image registration, an image calibration, etc. on the reference visible image(s) and the reference thermal image(s). As another example, the processing device 120 may determine corresponding reference points in the reference visible image(s) and the reference thermal image(s) respectively, and determine the location relationship between the visible capture unit and the thermal capture unit based on the corresponding reference points.

In 550, the processing device 120 (e.g., the temperature determination module 450) (e.g., the processing circuits of the processor 220) may determine a temperature of the subject based on the second location information associated with the face and the distance between the subject and the image capture device.

In some embodiments, the processing device 120 may determine gray values (e.g., gray values of a face region, gray values of a forehead region, gray values of a central forehead region) associated with the face in the thermal image based on the second location information associated with the face. Then the processing device 120 may determine the temperature of the subject based on the gray values associated with the face in the thermal image and the distance between the subject and the image capture device.

In some embodiments, the processing device 120 may convert the gray values associated with the face into initial temperature values associated with the face and determine an initial temperature of the subject based on the initial temperature values, for example, an average of the initial temperature values, a weighted average of the initial temperature values, a highest one of the initial temperature values, etc. As described elsewhere in the present disclosure, since thermal radiation of the subject may be attenuated as a distance between the thermal capture device and the subject increases, the initial temperature of the subject is not an actual temperature of the subject, but is associated with the distance between the subject and the image capture device. Accordingly, the processing device 120 may determine a target temperature of the subject by modifying the initial temperature with the distance between the subject and the image capture device taken into consideration.

In some embodiments, the processing device 120 may determine the target temperature of the subject according to Formula (2) below:

$$h = \theta(d, T) \tag{2}$$

wherein h refers to the target temperature, $\theta$ refers to a function or a model for determining the target temperature, d refers to the distance between the subject and the image capture device, and T refers to the initial temperature. In some embodiments, Formula (2) may be a high-order regression function simulated based on a plurality of reference distances between reference subjects and the image capture device and reference temperatures of the reference subjects.

In some embodiments, the processing device 120 may also determine a core temperature of the subject based on the target temperature (which may be a shell temperature) of the subject and a core-shell temperature conversion relationship. More descriptions regarding the determination of the core temperature may be found elsewhere in the present disclosure, for example, FIG. 6 and the descriptions thereof.

In some embodiments, the processing device 120 may determine whether the temperature of the subject is within a reference temperature range. In some embodiments, the reference temperature range may include a default temperature range that the temperature determination system 100 can measure, a temperature range predetermined by an operator, etc.

In some embodiments, in response to determining that the temperature of the subject is within the reference temperature range, the processing device 120 may cause a display device (e.g., the display device 130) to display information associated with the subject. The displayed information associated with the subject may include the bounding box of the face, the temperature (e.g., the target temperature, the core temperature) of the subject, the face of the subject, the distance between the subject and the image capture device, a location of the subject, or the like, or any combination thereof. In some embodiments, the processing device 120 may add the information associated with the subject in the visible image or the thermal image and cause the display device to display the visible image or the thermal image with the information.

In some embodiments, in response to determining that the temperature of the subject is not within the reference temperature range, the processing device 120 may not cause the display device to display the information associated with the subject. As described above, the reference temperature range may include a default temperature range that the temperature determination system 100 can measure or a temperature range predetermined by an operator. Accordingly, if the temperature of the subject is not within the reference temperature range, it may indicate that there may be an abnormality associated with the system or the measured temperature does not meet user requirements. In this situation, the processing device 120 may generate and provide a notification or an alert.

In some situations, since the temperature of the subject may be affected by an environmental temperature, if the environmental temperature is relatively high, the determine temperature of the subject may be relatively high and accordingly out of the reference temperature range, which is not caused by abnormality associated with the system. Accordingly, in some embodiments, the processing device 120 may determine a temperature of a reference subject (e.g., a black body) and determine whether the temperature of the reference subject is not within the reference temperature range, thereby determining whether there may be an abnormality associated with the system.

In some embodiments, in response to determining that the temperature of the subject is within the reference temperature range, the processing device 120 may also determine whether the temperature of the subject is within a normal temperature range (e.g., 35° C.-37° C.). In response to determining that the temperature of the subject is within the normal temperature range, the processing device 120 may cause the display device to display the information associated with the subject in a first mode. In response to determining that the temperature of the subject is not within the normal temperature range, the processing device 120 may cause the display device to display the information associated with the subject in a second mode.

In some embodiments, display parameter(s) (e.g., a color, a shape, a size, a marker) of the first mode may be at least partially different from that of the second mode. For example, the information may be displayed in green in the first mode while may be displayed in red in the second mode. As another example, the processing device 120 may add a label (e.g., a textual description, a graphic pattern) indicating an abnormal temperature in the second mode. As a further example, the processing device 120 may adjust (e.g., enlarge) a size of the bounding box of the face in the second mode. In some embodiments, the processing device 120 may also generate an alarm in the second mode. The alarm may include a voice alarm, a light alarm, calling a policeman, closing a pass gate, lighting the subject, blocking a pass-way of the subject, or the like, or any combination thereof.

In some embodiments, in response to determining that the temperature of the subject is not within the reference temperature range or the normal temperature range, the processing device 120 may perform at least one additional temperature determination operation, thereby improving the accuracy of the temperature determination. In response to determining that a temperature of the subject determined by the at least one additional temperature determination operation is not within the reference temperature range, the processing device 120 may determine that there may be an abnormality associated with the system or the measured temperature does not meet user requirements and generate a corresponding notification. In response to determining that a temperature of the subject determined by the at least one additional temperature determination operation is within the reference temperature range and not within the normal temperature range, the processing device 120 may cause the display device to display the information associated with the subject in the second mode. In response to determining that the temperature of the subject determined by the at least one additional temperature determination operation is within the normal temperature range, the processing device 120 may cause the display device to display the information associated with the subject in the first mode.

In some embodiments, for each of the at least one subject, the processing device 120 may determine a reference parameter associated with the subject. In some embodiments, the reference parameter may include the distance between the subject and the image capture device, a moving speed of the subject, a moving direction of the subject, etc. In some embodiments, the processing device 120 may obtain a plurality of images of the subject acquired by the image capture device within a time period and determine the moving speed or the moving direction of the subject based on the plurality of images.

In some embodiments, the processing device 120 may determine a priority order of the at least one subject based on at least one reference parameter corresponding to the at least one subject respectively. In some embodiments, take a specific subject as an example, in response to determining that the reference parameter of the subject satisfies a condition, the processing device 120 may prioritize to determine a temperature of the subject based on the process described above. For example, the condition may include that the distance between the subject and the image capture device is smaller than a threshold, the moving speed of the subject is larger than a threshold, or the moving direction of the subject is a direction away from the image capture device, thereby avoiding missing the temperature determination for the subject.

In some embodiments, for each of the at least one subject, the processing device 120 may determine whether a temperature of the subject has been determined. In response to determining that the temperature of the subject has been determined and the temperature of the subject is within the normal temperature range, the processing device 120 may not determine the temperature of the subject again, thereby avoiding unnecessarily repeated temperature determination operations.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation)

may be added elsewhere in the process 500. In the storing operation, the processing device 120 may store information and/or data (e.g., the target temperature of the subject, the core temperature of the subject, the bounding box of the face of the subject) associated with the temperature determination in a storage device (e.g., the storage device 150, the ROM 230, the RAM 240, and/or the storage 390) disclosed elsewhere in the present disclosure.

FIG. 6 is a flowchart illustrating an exemplary process for determining a temperature of a subject according to some embodiments of the present disclosure. In some embodiments, the process 600 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process illustrated in FIG. 6 and described below is not intended to be limiting.

In 610, the processing device 120 (e.g., the temperature determination module 450) (e.g., the interface circuits of the processor 220) may obtain a current environmental temperature of an environment where an image capture device (e.g., the image capture device 110) is located.

In 620, the processing device 120 (e.g., the temperature determination module 450) (e.g., the processing circuits of the processor 220) may determine a current shell temperature (e.g., the target temperature described in FIG. 5) of a subject.

In 630, the processing device 120 (e.g., the temperature determination module 450) (e.g., the processing circuits of the processor 220) may determine a current core temperature of the subject corresponding to the current shell temperature based on a shell-core temperature conversion relationship, the current environmental temperature, and the current shell temperature of the subject.

In some embodiments, the shell-core temperature conversion relationship may be predetermined. Reference core temperatures of different reference subjects under different reference environmental temperatures may be predetermined using a temperature measurement device (e.g., a temperature gun). The shell-core temperature conversion relationship may be determined based on the reference core temperatures of different reference subjects under different reference environmental temperatures. Merely by way of example, the shell-core temperature conversion relationship may be shown in Table (1) below:

| Shell Temperature | | Environmental Temperature | | |
| --- | --- | --- | --- | --- |
| | ... | 15° C. | 20° C. | ... |
| | | Core Temperature | | |
| ... | ... | ... | ... | ... |
| 30° C. | ... | 30.8° C. | 30.5° C. | ... |
| 35° C. | ... | 36.1° C. | 35.8° C. | ... |
| ... | ... | ... | ... | ... |

In some embodiments, the processing device 120 may obtain a first environmental temperature and a second environmental temperature that are closest to the current environmental temperature and a first shell temperature and a second shell temperature that are closest to the current shell temperature of the subject in the shell-core temperature conversion relationship. For example, if the current shell temperature of the subject is 30.8° C. which is between 30° C. and 35° C., and the current environmental temperature is 18° C. which is between 15° C. and 20° C., accordingly, the first environmental temperature is 15° C. and the second environmental temperature is 20° C.; the first shell temperature is 30° C. and the second shell temperature is 35° C.

In some embodiments, the processing device 120 may determine a first weight that a difference (e.g., an absolute value) between the current environmental temperature and the first environmental temperature accounts for a difference (e.g., an absolute value) between the first environmental temperature and the second environmental temperature. The processing device 120 may determine a second weight that a difference (e.g., an absolute value) between the current environmental temperature and the second environmental temperature accounts for a difference (e.g., an absolute value) between the first environmental temperature and the second environmental temperature.

In some embodiments, the processing device 120 may determine a first core temperature and a second core temperature corresponding to the first shell temperature and the second shell temperature under the current environmental temperature based on the first weight and the second weight, respectively. Further, the processing device 120 may determine a third weight that a difference between the current shell temperature and the first shell temperature accounts for a difference between the first shell temperature and the second shell temperature. The processing device 120 may determine a fourth weight that a difference between the current shell temperature and the second shell temperature accounts for the difference between the first shell temperature and the second shell temperature. The processing device 120 may determine the current core temperature of the subject corresponding to the current shell temperature based on the third weight, the fourth weight, the first core temperature, and the second core temperature.

For example, the processing device 120 may determine the first core temperature and the second core temperature according to Formulas (3) and (4) below:

$$30.5 \times \frac{18-15}{20-15} + 30.8 \times \frac{20-18}{20-15} = 30.62° \text{ C.} \qquad (3)$$

$$35.8 \times \frac{18-15}{20-15} + 36.1 \times \frac{20-18}{20-15} = 35.92° \text{ C.} \qquad (4)$$

The processing device 120 may determine the current core temperature corresponding to the current shell temperature according to Formula (5) below:

$$35.92 \times \frac{34-30}{35-30} + 30.62 \times \frac{35-34}{35-30} = 34.86° \text{ C.} \qquad (5)$$

Figure 7:
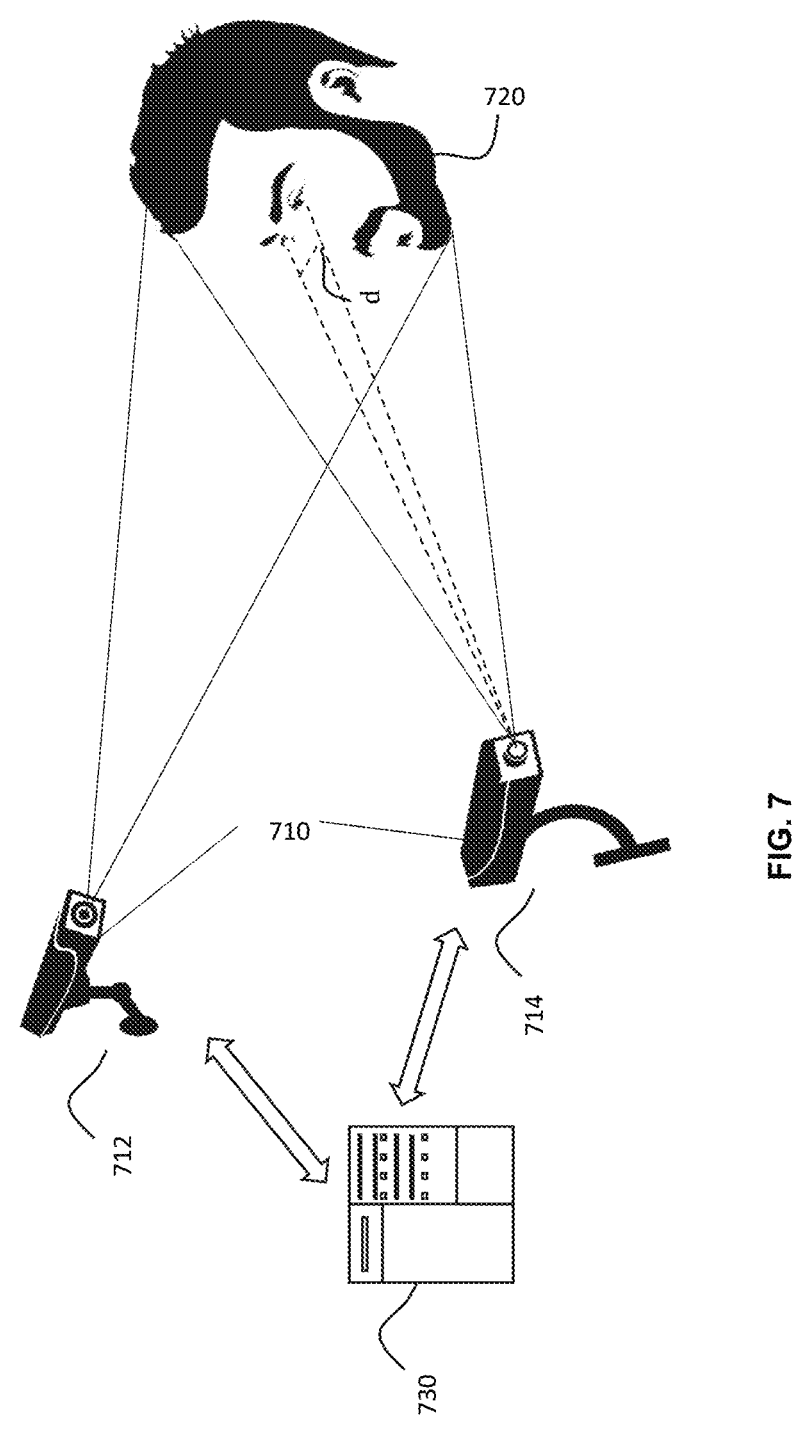
FIG. 7 is a schematic diagram illustrating exemplary temperature determination according to some embodiments of the present disclosure.

FIG. 7 is a schematic diagram illustrating exemplary temperature determination according to some embodiments of the present disclosure.

As shown in FIG. 7, an image capture device 710 may include a visible capture unit 712 (e.g., a visible camera) and a thermal capture unit 714 (e.g., a thermal camera). The visible capture unit 712 may be used to acquire a visible image of a subject 720. The thermal capture unit 714 may be used to capture a thermal image of the subject 720. The image capture device 710 may transmit the visible image and the thermal image to a processing device 730 (e.g., the processing device 120) connected thereto. The processing device 730 may be used to determine a temperature of the subject 720 based on the visible image and the thermal image, more descriptions of which may be found in FIGS. 4-6 and the descriptions thereof.

It should be noted that the above descriptions are for illustration purposes and non-limiting. In some embodiments, the image capture device 710 may be a binocular camera including a thermal lens used to acquire the thermal image and a visible lens used to acquire the visible image, and integrated in the processing device 730.

Figure 8A:
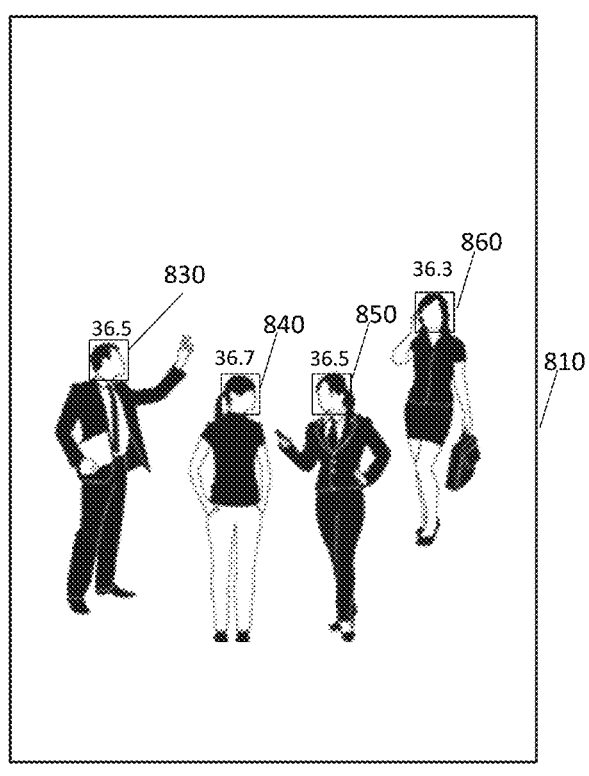
FIG. 8A and FIG. 8B are schematic diagrams illustrating exemplary displays of temperature determination results according to some embodiments of the present disclosure.
Figure 8B:
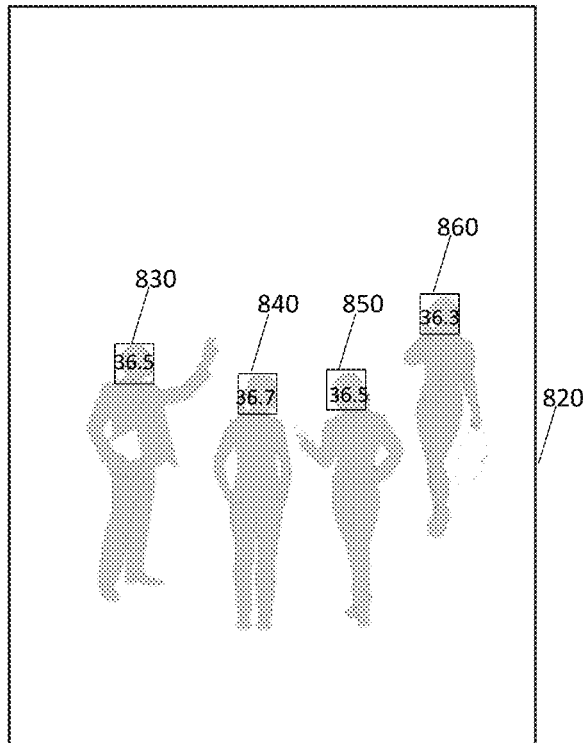

FIG. 8A and FIG. 8B are schematic diagrams illustrating exemplary displays of temperature determination results according to some embodiments of the present disclosure.

As shown in FIG. 8A and FIG. 8B, there are four subjects. The processing device 120 may determine bounding boxes (e.g., 830, 840, 850, 860 in FIG. 8A and FIG. 8B) and temperatures (e.g., 36.5° C., 36.7° C., 36.5° C., 36.3° C.) of the four subjects. In some embodiments, the processing device 120 may cause a display device to display the bounding boxes and the temperatures of the four subjects together with the visible image 810 in FIG. 8A. In some embodiments, the processing device 120 may cause the display device to display the bounding boxes and the temperatures of the four subjects together with the thermal image 820 in FIG. 8B.

FIG. 9 is a flowchart illustrating an exemplary process for determining a temperature of a subject according to some embodiments of the present disclosure. In some embodiments, the process 900 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process illustrated in FIG. 9 and described below is not intended to be limiting.

In 910, the processing device 120 may obtain a visible image and a thermal image of a region. In some embodiments, the visible image and the thermal image may include at least one subject (e.g., a person), respectively. More descriptions regarding operation 910 may be found elsewhere in the present disclosure, for example, operation 510 and the descriptions thereof.

In 920, for each of the at least one subject, the processing device 120 may obtain a bounding box of a face corresponding to the subject in the visible image and a distance between the subject and an image capture device. More descriptions regarding operation 920 may be found elsewhere in the present disclosure, for example, operation 520, operation 530, and the descriptions thereof.

In 930, the processing device 120 may obtain a coordinate of a bounding box of the face in the thermal image and obtain gray values of the face in the bounding box in the thermal image based on the coordinate. In 940, the processing device 120 may obtain a shell temperature of the subject corresponding to the face in the bounding box based on the gray values in the thermal image and the distance. More descriptions regarding operations 930 and 940 may be found elsewhere in the present disclosure, for example, operation 540, operation 550, the descriptions thereof, and the process 600.

FIG. 10 is a flowchart illustrating an exemplary process for determining a temperature of a subject according to some embodiments of the present disclosure. In some embodiments, the process 1000 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process illustrated in FIG. 10 and described below is not intended to be limiting.

In 1010, the processing device 120 may obtain a current environmental temperature of an environment where an image capture device is located.

In 1020, the processing device 120 may retrieve core temperatures, under different environmental temperatures and in a shell-core temperature conversion table, corresponding to a current shell temperature of a subject corresponding to a face in a bounding box. In 1030, the processing device 120 may compensate the core temperatures in the shell-core temperature conversion table based on a relationship between the current environmental temperature and environmental temperatures in the shell-core temperature conversion table to obtain a current core temperature of the subject corresponding to the face in the bounding box. More descriptions regarding the process 1000 may be found elsewhere in the present disclosure, for example, the process 900.

Figure 11:
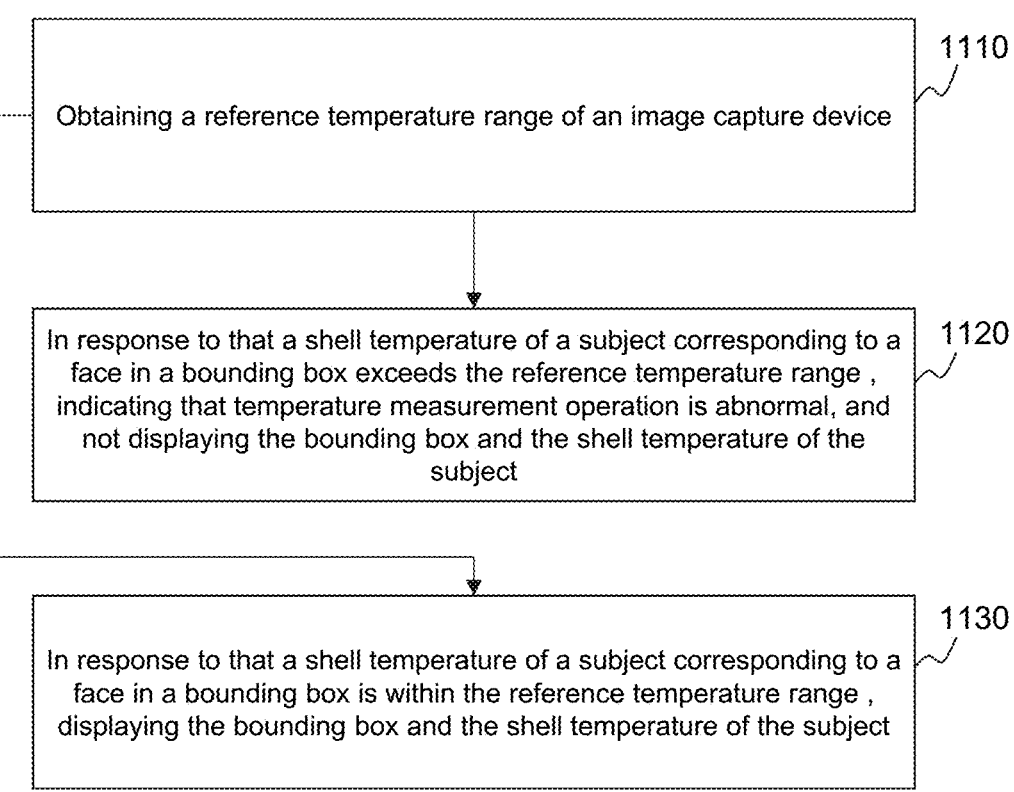
FIG. 11 is a flowchart illustrating an exemplary process for displaying information associated with a temperature determination result of a subject according to some embodiments of the present disclosure.

FIG. 11 is a flowchart illustrating an exemplary process for displaying information associated with a temperature determination of a subject according to some embodiments of the present disclosure. In some embodiments, the process 1100 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 1100. The operations of the illustrated process presented below are intended to be illustrative. In some embodiments, the process 1100 may be accomplished with one or more additional operations not described and/or without one or more of the operations herein discussed. Additionally, the order in which the operations of the process illustrated in FIG. 11 and described below is not intended to be limiting.

In 1110, the processing device 120 may obtain a reference temperature range of an image capture device. The processing device 120 may determine whether a shell temperature of a subject corresponding to a face in a bounding box is within the reference temperature range. The shell temperature of the subject may be determined based on the process 500, 600, 900, or 1000.

In 1120, in response to determining that the shell temperature of the subject corresponding to the face in the bounding box exceeds the reference temperature range, the processing device 120 may indicate that the temperature determination operation is abnormal, and not display the bounding box and the shell temperature of the subject. In 1130, in response to determining that the shell temperature of the subject corresponding to the face in the bounding box is within the reference temperature range, the processing device 120 may display the bounding box and the shell temperature of the subject. More descriptions regarding the process 1100 may be found elsewhere in the present disclosure, for example, operation 550 and the descriptions thereof.

According to some embodiments of the present disclosure, a method for measuring a temperature of a subject may be provided. The method may include obtaining a visible image and a thermal image of a region; obtaining a bounding box of a face in the visible image and a distance between a subject corresponding to the face and an image capture device; obtaining a coordinate of a bounding box of the face in the thermal image and obtaining gray values of the face in the bounding box in the thermal image based on the coordinate; and obtaining a current shell temperature of the subject based on the gray values in the thermal image and the distance.

In some embodiments, the method may include: obtaining the current shell temperature of the subject before compensation based on the gray values of the bounding box in the thermal image; and input the current shell temperature of the subject before compensation and the distance into a trained regression model to obtain the current shell temperature of the subject after compensation.

In some embodiments, the method may include: obtaining a current environmental temperature of an environment where the image capture device is located; retrieving core temperatures, under different environmental temperatures and in a shell-core temperature conversion table, corresponding to the current shell temperature of the subject; and compensating the core temperatures in the shell-core temperature conversion table based on a relationship between the current environmental temperature and environmental temperatures in the shell-core temperature conversion table to obtain a current core temperature of the subject.

In some embodiments, the method may include: obtaining a first environmental temperature and a second environmental temperature that are closest to the current environmental temperature and a first shell temperature and a second shell temperature that are closest to the current shell temperature of the subject in the temperature conversion table; calculating a first weight of an environmental temperature that a difference between the current environmental temperature and the first environmental temperature accounts for a difference between the first environmental temperature and the second environmental temperature; calculating a second weight of the environmental temperature that a difference between the current environmental temperature and the second environmental temperature accounts for a difference between the first environmental temperature and the second environmental temperature; calculating a first core temperature and a second core temperature corresponding to the first shell temperature and the second shell temperature under the current environmental temperature based on the first weight and the second weight of the environmental temperature, respectively; calculating a first weight of a shell temperature that a difference between the current shell temperature and the first shell temperature accounts for a difference between the first shell temperature and the second shell temperature; calculating a second weight of the shell temperature that a difference between the current shell temperature and the second shell temperature accounts for the difference between the first shell temperature and the second shell temperature; and calculating a current core temperature of the subject corresponding to the first core temperature and the second core temperature under the current shell temperature based on the first weight of the shell temperature and the second weight of the shell temperature.

In some embodiments, after the obtaining a current shell temperature of the subject based on the gray values in the thermal image and the distance, the method may include: obtaining a reference temperature range of the image capture device; in response to determining that the current shell temperature of the subject exceeds the reference temperature range, indicating that the temperature determination operation is abnormal, and not displaying the bounding box and the shell temperature of the subject; or in response to determining that the current shell temperature of the subject is within the reference temperature range, displaying the bounding box and the current shell temperature of the subject.

In some embodiments, the method may include: obtaining a normal temperature range of the subject; in response to determining that the current shell temperature of the subject exceeds the normal temperature range, displaying the bounding box and the current shell temperature of the subject by highlighted or changed colors and generating an alarm event.

In some embodiments, the method may include: inputting the visible image into a recognition model to obtain a bounding box and pupillary distance information of each face in the visible image; and calculating the distance based on a conversion parameter associated with the image capture device and the pupillary distance information.

In some embodiments, the method may include: obtaining age information of each face outputted by the recognition model; obtaining a correction parameter of each face based on the age information of each face; and calculating the distance based on the pupillary distance information, the correction parameter, and the conversion parameter.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

What is claimed is:

1. A system, comprising:

at least one storage device including a set of instructions; and at least one processor in communication with the at least one storage device, wherein when executing the set of instructions, the at least one processor is configured to cause the system to:

obtain a visible image and a thermal image from an image capture device, the visible image including at least one subject;

for each of the at least one subject, determine first location information associated with a face of the subject in the visible image;

determine a distance between the subject and the image capture device based on the visible image;

determine second location information associated with the face in the thermal image based on the first location information associated with the face; and determine a temperature of the subject based on the second location information associated with the face and the distance between the subject and the image capture device;

for each of the at least one subject, determine a reference parameter associated with the subject, the reference parameter including a moving speed of the subject or a moving direction of the subject; and determine a priority order of the at least one subject based on at least one reference parameter corresponding to the at least one subject respectively.

2. The system of claim 1, wherein to determine a distance between the subject and the image capture device based on the visible image, the at least one processor is configured to cause the system to:

determine a visible size associated with at least one reference object associated with the subject in the visible image; and determine the distance between the subject and the image capture device based on the visible size associated with the at least one reference object in the visible image and a physical size associated with the at least one reference object.

3. The system of claim 2, wherein the at least one reference object includes pupil points of the subject, a marker stuck to the subject, or an environmental marker.

4. The system of claim 1, wherein to determine second location information associated with the face in the thermal image based on the first location information associated with the face, the at least one processor is configured to cause the system to:

determine a coordinate conversion relationship between a first coordinate of a visible capture unit used to capture the visible image and a second coordinate of a thermal capture unit used to capture the thermal image based on a location relationship between the visible capture unit and the thermal capture unit, wherein the visible capture unit and the thermal capture unit are included in the image capture device;

determine the second location information associated with the face in the thermal image based on the first location information associated with the face and the coordinate conversion relationship.

5. The system of claim 1, wherein to determine a temperature of the subject based on the second location information associated with the face and the distance between the subject and the image capture device, the at least one processor is configured to cause the system to:

determine gray values associated with the face in the thermal image based on the second location information; and determine the temperature of the subject based on the gray values associated with the face in the thermal image and the distance between the subject and the image capture device.

6. The system of claim 1, wherein the at least one processor is configured to cause the system further to:

determine whether the temperature of the subject is within a reference temperature range;

in response to determining that the temperature of the subject is within the reference temperature range, cause a display device to display information associated with the subject; and in response to determining that the temperature of the subject is not within the reference temperature range, not cause the display device to display information associated with the subject.

7. The system of claim 6, wherein the displayed information associated with the subject includes at least one of a bounding box of the face, the temperature of the subject, the distance between the subject and the image capture device, or a location of the subject.

8. The system of claim 6, wherein to cause the display device to display information associated with the subject, the at least one processor is configured to cause the system further to:

determine whether the temperature of the subject is within a normal temperature range;

in response to determining that the temperature of the subject is within the normal temperature range, cause the display device to display the information associated with the subject in a first mode;

in response to determining that the temperature of the subject is not within the normal temperature range, cause the display device to display the information associated with the subject in a second mode.

9. The system of claim 8, wherein the at least one processor is configured to cause the system further to:

in response to determining that the temperature of the subject is not within the reference temperature range or the normal temperature range, perform at least one additional temperature determination operation.

10. A method implemented on a computing device having at least one processor, at least one storage medium, and a communication platform connected to a network, the method comprising:

obtaining a visible image and a thermal image from an image capture device, the visible image including at least one subject;

for each of the at least one subject, determining first location information associated with a face of the subject in the visible image;

determining a distance between the subject and the image capture device based on the visible image;

determining second location information associated with the face in the thermal image based on the first location information associated with the face; and determining a temperature of the subject based on the second location information associated with the face and the distance between the subject and the image capture device;

for each of the at least one subject, determining a reference parameter associated with the subject, the reference parameter including a moving speed of the subject or a moving direction of the subject; and determining a priority order of the at least one subject based on at least one reference parameter corresponding to the at least one subject respectively.

11. The method of claim 10, wherein the determining a distance between the subject and the image capture device based on the visible image includes:

determining a visible size associated with at least one reference object associated with the subject in the visible image; and determining the distance between the subject and the image capture device based on the visible size associated with the at least one reference object in the visible image and a physical size associated with the at least one reference object.

12. The method of claim 11, wherein the at least one reference object includes pupil points of the subject, a marker stuck to the subject, or an environmental marker.

13. The method of claim 10, wherein the determining second location information associated with the face in the thermal image based on the first location information associated with the face includes:

determining a coordinate conversion relationship between a first coordinate of a visible capture unit used to capture the visible image and a second coordinate of a thermal capture unit used to capture the thermal image based on a location relationship between the visible capture unit and the thermal capture unit, wherein the visible capture unit and the thermal capture unit are included in the image capture device;

determining the second location information associated with the face in the thermal image based on the first location information associated with the face and the coordinate conversion relationship.

14. The method of claim 10, wherein the determining a temperature of the subject based on the second location information associated with the face and the distance between the subject and the image capture device includes:

determining gray values associated with the face in the thermal image based on the second location information; and determining the temperature of the subject based on the gray values associated with the face in the thermal image and the distance between the subject and the image capture device.

15. A non-transitory computer readable medium, comprising executable instructions that, when executed by at least one processor, directs the at least one processor to perform a method, the method comprising:

obtaining a visible image and a thermal image from an image capture device, the visible image including at least one subject;

for each of the at least one subject, determining first location information associated with a face of the subject in the visible image;

determining a distance between the subject and the image capture device based on the visible image;

determining second location information associated with the face in the thermal image based on the first location information associated with the face; and determining a temperature of the subject based on the second location information associated with the face and the distance between the subject and the image capture device;

for each of the at least one subject, determining a reference parameter associated with the subject, the reference parameter including a moving speed of the subject or a moving direction of the subject; and determining a priority order of the at least one subject based on at least one reference parameter corresponding to the at least one subject respectively.

16. The system of claim 5, wherein to determine a reference parameter associated with the subject, the at least one processor is configured to cause the system to:

for each of the at least one subject, obtain a plurality of images of the subject acquired by the image capture device within a time period;

determine the moving speed or the moving direction of the subject based on the plurality of images.

17. The system of claim 16, wherein to determine a priority order of the at least one subject based on at least one reference parameter corresponding to the at least one subject respectively, the at least one processor is configured to cause the system to:

for each of the at least one subject, in response to determining that the reference parameter of the subject satisfies a condition, prioritize to determine a temperature of the subject, wherein the condition includes that the moving direction of the subject is a direction away from the image capture device.

18. The system of claim 17, wherein to determine the temperature of the subject based on the gray values associated with the face in the thermal image and the distance between the subject and the image capture device, the at least one processor is configured to cause the system to:

obtain a current shell temperature of the subject before compensation based on the gray values associated with the face in the thermal image;

obtain the current shell temperature of the subject after compensation by inputting the current shell temperature of the subject before compensation and the distance between the subject and the image capture device into a trained regression model;

obtain a current environmental temperature of an environment where the image capture device is located;

retrieve a core temperature corresponding to the current shell temperature of the subject after compensation based on the current environmental temperature and a shell-core temperature conversion table;

obtain a current core temperature of the subject by compensating the core temperature based on a relationship between the current environmental temperature and environmental temperatures in the shell-core temperature conversion table.

19. The system of claim 18, wherein to obtain a current core temperature of the subject by compensating the core temperature based on a relationship between the current environmental temperature and environmental temperatures in the shell-core temperature conversion table, the at least one processor is configured to cause the system to:

obtain, in the shell-core temperature conversion table, a first environmental temperature and a second environmental temperature that are closest to the current environmental temperature and a first shell temperature and a second shell temperature that are closest to the current shell temperature of the subject after compensation;

calculate a first weight of an environmental temperature as a ratio of a difference between the current environmental temperature and the first environmental temperature to a difference between the first environmental temperature and the second environmental temperature;

calculate a second weight of the environmental temperature as a ratio of a difference between the current environmental temperature and the second environmental temperature to a difference between the first environmental temperature and the second environmental temperature;

calculate a first core temperature and a second core temperature corresponding to the first shell temperature and the second shell temperature under the current environmental temperature based on the first weight and the second weight of the environmental temperature, respectively;

calculate a first weight of a shell temperature as a ratio of a difference between the current shell temperature and the first shell temperature to a difference between the first shell temperature and the second shell temperature;

calculate a second weight of the shell temperature as a ratio of a difference between the current shell temperature and the second shell temperature to the difference between the first shell temperature and the second shell temperature; and calculate the current core temperature of the subject corresponding to the first core temperature and the second core temperature under the current shell temperature based on the first weight of the shell temperature and the second weight of the shell temperature.

* * * * *